3,655,628
NOVEL COPOLYMERS OF α-AMINO ACID-N-CAR-
BOXYLIC ANHYDRIDE WITH ORGANIC ISO-
CYANATES AND PROCESS FOR PREPARING
THE SAME
Shinzi Uchida, Hiroshi Nishizawa, and Yasuo Sone,
Hitachi-shi, Japan, assignors to Hitachi Chemical Company Ltd., Tokyo, Japan
No Drawing. Filed Dec. 24, 1969, Ser. No. 888,028
Claims priority, application Japan, Dec. 27, 1968,
44/95,479
Int. Cl. C08g 22/00
U.S. Cl. 260—77.5 CA        10 Claims

ABSTRACT OF THE DISCLOSURE

Novel polypeptide-polyurea copolymers are prepared by dissolving an α-amino acid-N-carboxylic anhydride and an organic isocyanate in an organic solvent, adding to the resulting solution an organic amine as a reaction initiator and then reacting the resulting mixture at room temperature or an elevated temperature, preferably at a temperature within the range of room temperature to 70° C.

This invention relates to a process for preparing polypeptide-polyurea copolymers of a novel type by subjecting an α-amino acid-N-carboxylic anhydride (hereinafter referred to as "α-amino acid-NCA") to polymerization in the presence of an organic isocyanate using an organic amine as a polymerization initiator.

It has heretofore been known that an α-amino acid-NCA is easily polymerized in the presence of various catalysts, e.g. water, amines or salts of weak acids, to give high molecular weight poly-α-amino acids. It has also been known that isocyanates readily react with alcohols, amines or water to give polyurethanes or polyureas. However, copolymers of an α-amino acid-NCA with an organic isocyanate have never been known.

An object of the present invention is to provide a process for preparing novel copolymers of α-amino acid-NCA's with organic isocyanates.

Another object is to provide said novel copolymers.

Other objects will become apparent from the following description.

As a result of various studies on the polymerization of α-amino acid-NCA's, the present inventors have found that under certain conditions, they are easily copolymerized through intermediation of a third substance with organic isocyanates to give polypeptide-polyurea copolymers which have not been known heretofore. The fact that the above-mentioned copolymers have been obtained was easily confirmed from the solubilities of the products for solvents, the functional group analysis, infrared absorption spectrography and the reduced viscosities of samples separated from the products as set forth in Examples 1 and 2 shown hereinafter.

Further, the copolymer of an α-amino acid-N-carboxylic anhydride with a polyurethane prepolymer having terminal isocyanate groups prepared by reacting a low molecular weight isocyanate (for instance, 4,4'-diphenylmethane diisocyanate, tolylene diisocyanate, etc.) and a polyether glycol or polyester glycol, is extremely different in physical properties from a homopolymer of α-amino acid-N-carboxylic anhydride and a blend of a homopolymer of α-amino acid-N-carboxylic anhydride with a polyurethane prepolymer having terminal isocyanate groups in the same proportions as in said copolymer (see Examples 3, 4 and 5 which will be shown hereinafter).

As the α-amino acid-NCA's usable in the present invention, all of the α-amino acid-NCA's employed in ordinary polymerization may be used, and the amino acids thereof are not particularly restricted in kind. For example, α-amino acids-NCA's prepared from monoesters of acidic amino acids, such as γ-methyl-L-glutamate, γ-benzyl-L-glutamate, γ-methyl-D-glutamate, β-methyl-L-aspartate and the like; neutral amino acids, such as glycine, leucine and the like; and basic amino acids, such as lysine, arginine and the like may be used.

As the isocyanates, there may be used organic compounds having at least one reactive isocyanate group, and polyurethane prepolymers having terminal isocyanate groups which have been obtained by the reaction of organic diisocyanates with polyols. Examples of the isocyanates include 1,6-hexamethylene diisocyanate, 1,10-decamethylene diisocyanate, 1,4-cyclohexylene diisocyanate, toluene-2,4-diisocyanate, diphenylmethane diisocyanate, metaphenylene diisocyanate, 4-chloro-1,3-phenylene diisocyanate, 1,4-cyclohexylene diisocyanate, 4,4'-methylene-bis (cyclohexyl isocyanate) and 1,5-tetrahydronaphthylene diisocyanate. As said urethane prepolymers having terminal isocyanate groups, there may be used compounds obtained by reacting a polyalkylene ether glycol, a polyester diol or a mixture of said polyol and a polyhydric alcohol such as trimethylolpropane, pentaerythritol, etc. with a molar excess of diisocyanates. Alternatively, there may be used prepolymers obtained by reacting a molar excess of polyalkylene ether glycols, polyester diols or mixtures of said polymers and such polyhydric alcohols as trimethylpropane, pentaerythritol, etc., with organic diisocyanates to form polymers having terminal hydroxyl groups, and further reacting the thus formed polymers with organic isocyanates. The molecular weights of these prepolymers are desirably less than 10,000. Examples of the above-mentioned polyalkylene ether glycols include polyethylene glycol, polypropylene glycol, polytetramethylene glycol, etc. and mixtures thereof, and examples of the above-mentioned polyester diols include polycaprolactone diol, and compounds obtained by the reaction of such polyalkylene ether glycols as polyethylene glycol, polypropylene glycol and polytetramethylene glycol with such dibasic acids as adipic, sebacic and succinic acids. The molecular weights of these are preferably within the range of 200 to 2,500.

As the catalysts (polymerization initiators) in the present invention, there may effectively be used amines represented by the following general formulas:

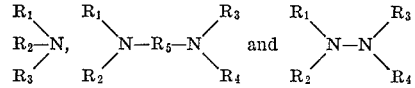

wherein $R_1$, $R_2$, $R_3$ and $R_4$ are hydrogen atoms or unsubstituted or substituted alkyl, cycloalkyl or aryl groups having 1 to 12 carbon atoms and at least two R's are hydrogen atoms or alkyl, cycloalkyl or aryl groups having 1 to 12 carbon atoms substituted by at least one radical having active hydrogen, and $R_5$ is a straight chain or cyclic methylene group having 2 to 10 carbon atoms or a benzene or condensed benzene ring. Examples of the above-mentioned amines include primary alkylamines such as methylamine, ethylamine, propylamine, butylamine, hexylamine and octylamine; primary unsaturated amines such as phenylamine, tolylamine and naphthylamine; alcoholamines such as methanolamine and ethanolamine; alkylenediamines such as ethylenediamine, and trimethylenediamine; and hydrazine.

The solvents employed in the polymerization are preferably chlorinated hydrocarbons such as dichloroethane, dichloromethane, chloroform and tetrachlorocarbon; ethers such as dioxane, tetrahydrofuran, diethyl ether, dimethoxyethane, diethylene glycol, dimethyl ether, dihydropyran and tetrahydropyran; dimethylformamide; and dimethylacetamide. These may be used either alone or in admixture of 2 or more.

The polymerization temperature is preferably from room temperature to 70° C.

The copolymers prepared in accordance with the present invention widely vary in properties depending on the ratio of components thereof and the kind of amino acid and isocyanate employed. For example. a copolymer having urea linkages in the main chain of a conventional polyamino acid can be obtained by dissolving in such a solvent as mentioned above a large amount of an α-amino acid-NCA and a small amount (preferably 2 to 40% by weight) of a polyurethane prepolymer having terminal isocyanate groups, and adding to the resulting solution a suitable amount of a polymerization initiator. The thus obtained copolymer is a modified polyamino acid and is applicable to the improvement in properties of polyamino acid fibers and films. That is, a fiber obtained by use of said copolymer is improved in such properties as modulus of elasticity, dyeability and solubility, and a film obtained by use of said copolymer is greatly improved in adhesion, elastic recovery, modulus of elasticity and solubility. When the copolymer is applied to a resin for synthetic leather or to a common paint, there is obtained a film which is tough and is excellent in appearance and feeling.

A copolymer obtained by polymerizing a mixture comprising a large amount (preferably 60 to 98% by weight) of a polyurethane prepolymer and a small amount of an α-amino acid-NCA in the presence of an initiator, or a copolymer obtained by adding a small amount of an α-amino acid-NCA during the course of chain extension of the polyurethane prepolymer is considerably different in hardness, modulus of elasticity and moisture absorptivity from a polyurethane elastomer obtained by only chain-extending polyurethane prepolymer.

Further, in proportion regions intermediary between the proportions mentioned above, there are obtained entirely different kind of copolymers. These copolymers are entirely novel high polymers having such interesting linkages as polypeptide-polyurea (which contain polyester-polyurethane or polyether-polyurethane linkages in the polyurea chains), and can be put into uses of a wide scope. The high molecular weight polymers are usable for fibers, films, paints and adhesives, while the low molecular weight polymers are usable for paints, adhesives, fiber adjuvants, antistatic agents, dyeability-improving agents and surface active agents.

The present invention is illustrated below with reference to Experimental Examples and Examples, but it is needless to say that the technical scope of the invention is not limited to these examples.

EXPERIMENTAL EXAMPLE A

Synthesis of polyurethane prepolymer

A four-necked flask equipped with a stirrer, a thermometer, a gas-feeding pipe and a condenser having a calcium chloride pipe was charged with 159 g. of polyethylene glycol (average molecular weight 600) while introducing dry nitrogen gas, and was heated to 85° C. To the flask was added 91.3 g. of 4,4'-diphenylmethane diisocyanate, and the content of the flask was reacted for about 5 hours at a temperature of 85°–90° C. to obtain a viscous polyurethane prepolymer having terminal isocyanate groups.

Isocyanate equivalent: $0.65 \times 10^{-3}$/g.

EXPERIMENTAL EXAMPLE B

Synthesis of poly-γ-methyl-L-glutamate resin solution

A flask equipped with a stirrer and a condenser having a calcium chloride pipe was charged with 40 g. of N-carboxylic anhydride of γ-methyl-L-glutamate. To the flask was added a mixture of 850 ml. of dichloroethane and 150 ml. of dimethylformamide to dissolve said anhydride. Thereafter, 0.5 g. of triethylamine was added as a polymerization initiator, and the mixture was quickly stirred at room temperature. After a while, the liquid became viscous and the reaction progressed with vigorous generation of carbon dioxide. The polymerization was substantially completed in about 10 hours (at 30° C.) to give a viscous transparent polymer solution which had a viscosity of 95 poises (at 30° C.) when the polymer concentration was 4%. This polymer solution was shaped into a film of 0.1–0.12 mm. in thickness.

EXAMPLE 1

Using the same reactor as in Experimental Example B, 100 g. of γ-methyl-L-glutamate-N-carboxylic anhydride was dissolved in a mixed solvent comprising 817 g. of dichloroethane and 273 g. of dimethylformamide, and the solution was charged with 1.32 g. of propanediamine and was subjected to polymerization at 30° C. for about 5 hours. Subsequently, the polymerization solution was charged into a large excess of acetone to precipitate a polymer. Thereafter, the polymer was taken out and was subjected to determination of terminal amino groups. This amino group equivalent of the polymer was $0.431 \times 10^{-3}$/g. Further the polymer was subjected to infrared absorption spectrography to confirm that it was a polymer of the γ-methyl-L-glutamate-N-carboxylic anhydride. The reduced viscosity of this polymer in dichloroacetic acid solution at 30° C. was 0.3 (DL/g.).

10 g. of this polymer was dissolved in a mixed solvent comprising 123 g. of dichloroethane and 10 g. of dimethylformamide. The resulting solution was incorporated with 0.2 g. of 4,4'-diphenylmethane diisocyanate and was subjected to polymerization at 50° C. for 30 minutes. Thereafter, the polymerization solution was charged into acetone to precipitate a polymer, which was then taken out. The reduced viscosity of the thus obtained polymer in dichloroacetic acid solution at 30° C. was 0.5 (DL/g.), and the terminal amino group equivalent thereof was $0.211 \times 10^{-3}$/g. In the infrared absorption spectrum of the polymer, there was observed no absorption of isocyanate group. From the above, it was confirmed that the isocyanate group had reacted with the terminal amino groups of poly-γ-methyl-L-glutamate which is a polymer of γ-methyl-L-glutamate-N- carboxylic anhydride.

EXAMPLE 2

Using the same reactor as in Experimental Example B, 26 g. of γ-methyl-L-glutamate-N-carboxylic anhydride and 9 g. of a polyurethane prepolymer synthesized in Experimental Example A were dissolved in a mixed solvent consisting of 300 g. of dichloroethane and 25 g. of dimethylformamide, and 0.13 g. of ethylene diamine was added to the resulting solution. The resulting mixture was subjected to polymerization at 30° C. for about 5 hrs. The resulting polymer solution was added to acetone through a capillary tube to obtain precipitates in the form of fiber. The precipitates were purified with dimethylformamide to remove the polyurethane prepolymer having terminal isocyanate groups and the polyurethane formed by the reaction of the polyurethane prepolymer and the ethylene diamine. The polyurethane prepolymer and the reaction product of the polyurethane prepolymer and the ethylene diamine were dissolved in dimethylformamide. The product from which the polyurethane prepolymer and the reaction product of the polyurethane prepolymer and the ethylene diamine had both been removed was confirmed by an infrared spectrophotometer and a nuclear magnetic resonance spectrograph to be a copolymer of γ-methyl-L-glutamate-N-carboxylic anhydride and a polyurethane prepolymer.

EXAMPLE 3

A four-necked flask equipped with a stirrer, a thermometer and a condenser having a calcium chloride pipe was charged with 345 g. of dichloroethylene and 30 g. of dimethylformamide, and was heated to 70° C. To the flask were added 9 g. of the polyurethane prepolymer synthesized in Experimental Example A and then 26 g. of γ-methyl-L-glutamate-N-carboxylic anhydride. Thereafter, 0.2 g. of ethylenediamine was added, and reaction was effected at 30° C. for 10 hours to obtain a viscous transparent solution. The thus obtained resin [hereinafter referred to as "Resin (a)"] was shaped into a film.

On the other hand, the polymethyl glutamate resin solution synthesized in Experimental Example B [said solution will be referred to as "Resin (b)" hereinafter], and a blend of 9 g. of the urethane prepolymer synthesized in Experimental Example A with Resin (b) in an amount corresponding to 26 g. of the γ-methyl-L-glutamate-N-carboxylic anhydride at the time of synthesis of the polymer solution [said blend will be referred to as "Resin (c)" hereinafter], were individually shaped into films.

These films were individually subjected to tensile test to draw hysteresis curves and to breaking test, and were compared with each other in modulus of elasticity, momentaneous elasticity recovery and breaking strength to obtain results as set forth below.

TEST METHOD (1) Tensile test (tester: "Autograph" manufactured by Shimazu Seisakusho)

Test piece: A strip of 10 cm. in length, 1 cm. in width and 0.1 mm. in thickness. (In the calculation of breaking strength, the thickness was reduced to 0.01 mm.)
Tensile speed: 50 mm./min.
Chuck interval: 60 mm.

(2) Adhesion test

Each sample of Resins (a), (b) and (c) was used to adhere urethane layers, and the adhered layers were dried by heating and then peeld off by means of a tensile tester.

Test piece: 10 cm. in length and 1 cm. in width.
Peeling speed: 500 mm./min.

| Sample | Momentaneous recovery at 20% elongation recovery (percent) | Modulus of elasticity (kg./cm.$^2$) | Breaking strength (kg./cm.$^2$) | Elongation (percent) | Adhesion (kg./cm. width) |
|---|---|---|---|---|---|
| (a) | 65 | 1.5×10$^3$ | 75 | 351 | 3.5 |
| (b) | 38 | 1.2×10$^4$ | 250 | 100 | 0.45 |
| (c) | 26 | 8.5×10$^3$ | 270 | 196 | 1.2 |

In the case when ethylenediamine was added to Resin (b) and a polyurethane prepolymer was then added thereto, and in the case when a polyurethane prepolymer was previously added to Resin (b) and ethylenediamine was then added thereto, the polyurethane prepolymer was chain-extended by means of the ethylenediamine, and then separated from the system. From such a phenomenon also, it is considered that in Resin (a), the polyurethane prepolymer and the N-carboxylic anhydride had not been polymerized separately, but had been copolymerized with each other through ethylenediamine, as in the case of Example 1.

EXAMPLE 4

Using the same reactor as in Example 3, a mixture comprising 491 g. of dichloroethane and 30 g. of dimethylformamide was heated to 30° C. and was charged with 19 g. of the polyurethane prepolymer synthesized in Experimental Example A and 26 g. of γ-methyl-L-glutamate-N-carboxylic anhydride. The resulting mixture was incorporated with 0.44 g. of ethylenediamine and was then reacted at 30° C. for 8 hours to obtain a viscous transparent solution. The thus obtained resin [hereinafter referred to as "Resin (a')"] was shaped into a film. On the other hand, Resin (b) and Resin (c) were individually shaped into films.

These films were subjected to the same tests as in Example 3 to obtain results as set forth below.

| Sample | Momentaneous recovery at 20% elongation recovery (percent) | Modulus of elasticity (kg./cm.$^2$) | Breaking strength (kg./cm.$^2$) | Elongation (percent) | Adhesion (kg./cm. width) |
|---|---|---|---|---|---|
| (a') | 88 | 3.5×10$^2$ | 49 | 512 | 5.4 |
| (b) | 38 | 1.2×10$^4$ | 250 | 100 | 0.45 |
| (c) | 30 | 4.7×10$^3$ | 110 | 329 | 1.65 |

EXAMPLE 5

Using the same reactor as in Example 3, a mixture comprising 896 g. of dichloroethane and 90 g. of dimethyl-formamide was heated to 30° C. and charged with 55 g. of the polyurethane prepolymer synthesized in Experimental Example A and 26 g. of γ-methyl-L-glutamate-N-carboxylic anhydride. The resulting mixture was incorporated with 1.1 g. of ethylenediamine and reacted at 30° C. for 5 hours to obtain a viscous transparent solution. The thus obtained resin [hereinafter referred to as "Resin (a")"] was shaped into a film. On the other hand, Resin (b) and Resin (c) were also shaped into films.

These films were subjected to the same tests as in Example 3 to obtain the results as set forth below.

| Sample | Momentaneous recovery at 20% elongation recovery (percent) | Modulus of elasticity (kg./cm.$^2$) | Breaking strength (kg./cm.$^2$) | Elongation (percent) | Adhesion (kg./cm. width) |
|---|---|---|---|---|---|
| (a") | 99 | 1.0×10$^2$ | 36 | 525 | 7.5 |
| (b) | 38 | 1.2×10$^4$ | 250 | 100 | 0.45 |
| (c) | 62 | 8.5×10$^3$ | 46 | 574 | 2.7 |

As is clear from Examples 3, 4 and 5, the copolymers according to the present invention are greatly different also in physical properties from α-amino acid-N-carboxylic anhydride straight polymers and blends thereof.

We claim:

1. A process for preparing a copolymer of an α-amino acid-N-carboxylic anhydride with an isocyanate which comprises dissolving an α-amino acid-N-carboxylic anhydride and an organic isocyanate in an organic solvent, adding to the resulting solution an organic amine as a reaction initiator, and then reacting the resulting mixture at room temperature or an elevated temperature.

2. A process according to claim 1, wherein the reaction temperature is in the range of from room temperature to 70° C.

3. A process according to claim 1, wherein the organic isocyanate is an alkylene diisocyanate, a cycloalkylene diisocyanate, a phenylene diisocyanate or a naphthylene diisocyanate.

4. A process according to claim 1, wherein the organic isocyanate is a polyurethane prepolymer having terminal isocyanate groups.

5. A process according to claim 1, wherein the α-amino acid-N-carboxylic anhydride is the N-carboxylic anhydride of α-methyl-L-glutamate, α-benzyl-L-glutamate, α-methyl-D-glutamate, β-methyl-L-aspartate, glycine, leucine, lysine or arginine.

6. A process according to claim 1, wherein the organic isocyanate is 4,4'-diphenylmethane diisocyanate, 1,6-hexamethylene diisocyanate, 1,10-decamethylene diisocyanate, 1,4-cyclohexylene diisocyanate, toluene-2,4-diisocyanate, metaphenylene diisocyanate, 4-chloro-1,3-phenylene diisocyanate, 1,4-cyclohexylene diisocyanate, 4,4'-methylenebis(cyclohexyl isocyanate), or 1,5-tetrahydronaphthylene diisocyanate.

7. A process according to claim 1, wherein the organic amine is represented by the formula:

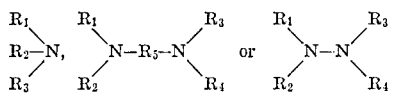

wherein $R_1$, $R_2$, R and $R_4$ are hydrogen atoms or unsubstituted or substituted alkyl, cycloalkyl or aryl groups having 1 to 12 carbon atoms, at least two R's being hydrogen atoms or alkyl, cycloalkyl or aryl groups having 1 to 12 carbon atoms substituted by at least one radical having active hydrogen, and $R_5$ is a straight chain or cyclic methylene group having 2 to 10 carbon atoms or a benzene or condensed benzene ring.

8. A process according to claim 1, wherein the organic amine is a primary alkylamine, a primary unsaturated amine, an alcoholamine, an alkylene diamine or hydrazine.

9. A process according to claim 1, wherein the amount of the organic isocyanate is 2% by weight to 98% by weight based on the weight of the α-amino acid-N-carboxylic anhydride.

10. Copolymers produced by the process of claim 1.

References Cited

UNITED STATES PATENTS 2,729,621   1/1956   Miegel _____ 260—77.5 CA

DONALD E. CZAJA, Primary Examiner

M. J. WELSH, Assistant Examiner

UNITED STATES PATENT OFFICE
CERTIFICATE OF CORRECTION

Patent No. 3,655,628                    Dated April 11, 1972

Inventor(s) Shinzi UCHIDA, Hiroshi NISHIZAWA and Yasuo SONE

It is certified that error appears in the above-identified patent and that said Letters Patent are hereby corrected as shown below:

In column 1, line 11 "44/95,479" should read --43/95479--

Signed and sealed this 2nd day of January 1973.

(SEAL)
Attest:

EDWARD M. FLETCHER, JR.            ROBERT GOTTSCHALK
Attesting Officer                  Commissioner of Patents